United States Patent [19]
Ozawa et al.

[11] 3,712,529
[45] Jan. 23, 1973

[54] MOVABLE WELDING JIG

[75] Inventors: Naosuke Ozawa; Takaaki Kawakami; Minoru Watabe, all of Tsu, Japan

[73] Assignee: Nippon Kokan Kubashiki Kaisha, Tokyo, Japan

[22] Filed: Sept. 16, 1970

[21] Appl. No.: 72,768

[52] U.S. Cl. ...................... 228/44, 29/200 J, 29/470, 228/4
[51] Int. Cl. .............................................. B23k 19/00
[58] Field of Search ........ 228/4, 25, 45, 44; 29/200 J, 29/200 P, 252, 470; 219/124, 125, 130; 269/25, 34, 41, 153

[56] References Cited

UNITED STATES PATENTS

| | | | |
|---|---|---|---|
| 2,986,075 | 5/1961 | Ranney | 269/34 X |
| 2,288,796 | 7/1942 | Edwards | 269/25 |
| 3,561,663 | 2/1971 | Wenyloff | 225/25 |
| 3,444,352 | 5/1969 | Ogden et al. | 219/125 |

Primary Examiner—J. Spencer Overholser
Assistant Examiner—R. J. Craig
Attorney—Steinberg & Blake

[57] ABSTRACT

A movable welding jig for welding upright reinforcing plates to a main plate. The jig has a pair of spaced wheel structures and posts extending upwardly therefrom and carrying an upper supporting structure from which a plurality of holding assemblies depend for holding in upright positions reinforcing plates to be welded to a main plate while being freely movable longitudinally along the reinforcing plates. The upper supporting structure carries a plurality of pressing units for pressing the reinforcing plates downwardly against the main plate. When used in connection with the welding of stringers to a main plate, a guide stringer is first welded, as by tack-welding, to the main plate, and then a movable jig is moved along the guide stringer to be guided thereby while holding additional stringers at predetermined positions with respect to the guide stringer.

10 Claims, 3 Drawing Figures

PATENTED JAN 23 1973 3,712,529
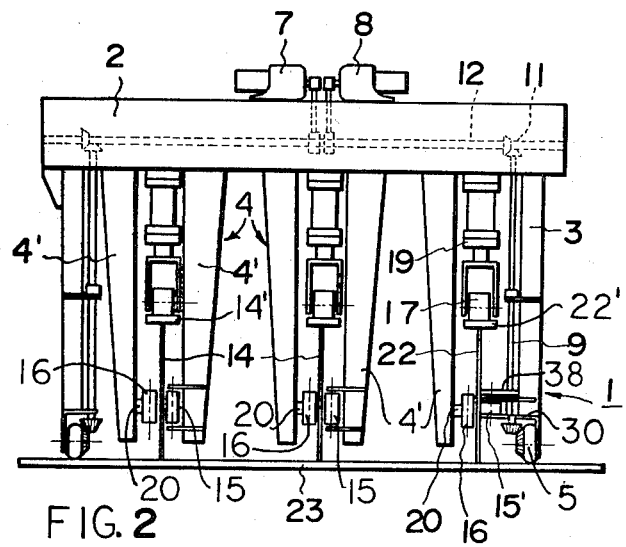
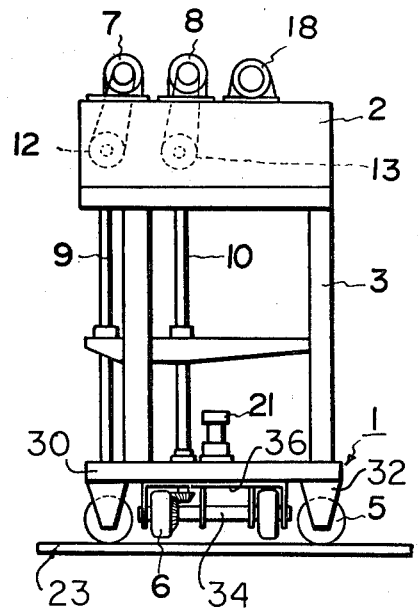
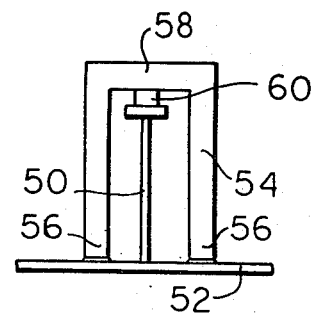
FIG. 3 PRIOR ART
INVENTORS
NAOSUKE OZAWA
TAKAAKI KAWAKAMI
MINORU WATABE
BY Steinberg + Blake
ATTORNEYS

MOVABLE WELDING JIG

BACKGROUND OF THE INVENTION

The present invention relates to welding.

In particular, the present invention relates to the welding of reinforcing plates to a main plate. For example, in the construction of ships it is known that internal stringers which extend longitudinally of the hull are to be welded to the outer hull plate so as to reinforce the latter. The invention is particularly designed for purposes of this latter type.

At the present time the reinforcing plates, which will form stringers in the case of ship building, for example, are tack welded to the main plate as part of the operations in achieving the final welded assembly. In order to properly hold the reinforcing plates with respect to the main plate so that the tack welding operations can be carried out precisely and effectively, it is necessary first to weld jigs to the main plate, and then these jigs are used in connection with additional wedges, blocks, and the like, for holding the reinforcing plates at predetermined positions with respect to the main plate so that the welding operations can then proceed. Thereafter it is necessary of course to remove these jigs which initially were welded to the main plate.

These conventional structures and operations have many disadvantages both from technical and economical standpoints. Thus, the procedures which require first welding of jigs to the main plate and then subsequently positioning the reinforcing plates with respect thereto are extremely time-consuming and inconvenient, requiring a considerable amount of manual labor which cannot be avoided. Also, the requirement of removal of the jigs involves a considerable amount of undesirable manual labor. Furthermore, the removal of the previously welded jigs often results in defects which must subsequently be repaired. Thus, a considerable amount of manual operations are unavoidable, particularly in connection with hammering of wedges into position for holding the reinforcing plates positioned properly with respect to the main plate.

A further serious disadvantage which is encountered with the above conventional systems resides in the fact that when the previously welded jigs are removed, an unavoidable annealing of the main plate occurs so that the quality thereof deteriorates considerably, particularly when the main plate is made of a high quality steel.

SUMMARY OF THE INVENTION

It is accordingly a primary object of the present invention to provide a structure as well as a method for avoiding the above drawbacks.

In particular it is an object of the invention to make it possible to completely eliminate the requirement of welding jigs to a main plate.

Furthermore it is an object of the present invention to provide the possibility of very greatly reducing the requirement of manual operations, limiting them to such operations as pushing buttons for closing switches, and similar operations.

In particular it is an object of the present invention to provide a movable welding jig which can precisely and effectively be used for welding, particularly tack-welding, reinforcing plates, such as stringers, to a main plate.

A further object of the present invention is to provide a movable welding jig which can be adjusted to a very large extent so that it can precisely hold reinforcing plates at any selected predetermined positions with respect to each other properly with respect to a main plate which the reinforcing plates are welded to.

Furthermore it is an object of the present invention to provide a movable welding jig which can move in a number of different directions.

Yet another object of the present invention is to provide a movable welding jig capable of pressing reinforcing plates against a main plate with an extremely large force.

It is also an object of the present invention to provide a method which enables one reinforcing plate or stringer to act as a guide for precisely determining the positions of additional reinforcing plates or stringers.

According to the invention the movable welding jig has a pair of spaced wheel means which respectively carry posts extending upwardly from the pair of wheel means. An upper support means is carried by the posts and extends across the space between the pair of wheel means, transversely with respect to a plurality of reinforcing plates along which the pair of wheel means, with all of the structure carried thereby, are longitudinally movable. A plurality of holding means are respectively carried by the upper support means and extend downwardly therefrom into engagement with the plurality of reinforcing plates for maintaining the latter upright on a main plate while being movable along the reinforcing plates. A plurality of pressing means are also carried by the upper support means and extend downwardly therefrom for pressing the reinforcing plates downwardly against the main plate while also being movable along the reinforcing plates, so that with this construction the entire jig while precisely positioning the reinforcing plates, facilitating the welding, such as tack-welding, thereof to the main plate in a highly precise manner, at the same time is freely movable longitudinally of the reinforcing plates. One of these reinforcing plates is initially welded, for example tack-welded, to the main plate so as to act as a guide, and then this guide is used for guiding the movable jig which will then precisely position the additional reinforcing plates with respect to the guide plate. With this method and with the above movable jig it becomes possible to bring about highly effective operations at relatively low cost in a number of different specific applications such as in the welding of stringers to a hull plate during the manufacture of ships.

BRIEF DESCRIPTION OF DRAWINGS

The invention is illustrated by way of example in the accompanying drawings which form part of this application and in which:

FIG. 1 is a schematic front elevation of a movable jig of the invention and also illustrates the method of the invention;

FIG. 2 is an end view of the movable jig of FIG. 1; and

FIG. 3 is a simplified schematic representation of the prior art.

DESCRIPTION OF PREFERRED EMBODIMENTS

Referring first to FIG. 3 which represents the prior art, it will be seen that according to the known procedures for welding, such as tack-welding, a reinforcing plate or stringer 50 to a main plate 52 which will form part of a ship hull, for example, a jig 54 of substantially U-shaped configuration is used. This jig is first welded at its bottom ends 56 directly to the plate 52. Then between the upper edge of the stringer or reinforcing plate 50 and the upper limb 58 of the jig 54 suitable wedges or blocks 60 are provided, these wedges or blocks being hammered into position so that the reinforcing plate or stringer 50 will be forcefully pressed downwardly against the main plate 52 while properly held in an upright position, as indicated in FIG. 3. With the stringer or reinforcing plate 50 thus properly positioned and held with respect to the main plate 52, tack-welding operations are carried out, through manual tack-welding operations, for example, so as to fix the plate 50 to the plate 52 prior to the subsequent operations where the welding of the plates to each other is completed. After these tack-welding operations have been completed, the wedges or blocks 60 are removed, again through manual operations, and then the welded bottom ends 56 of the jig 54 are separated from the plate 52. In this way the jig 54 is removed. The result is that not only are a considerable amount of manual operations unavoidable but in addition the welding of the jig 54 to the plate 52 results in undesirable annealing of the latter.

In order to avoid the many disadvantages encountered as the result of these conventional procedures illustrated in FIG. 3, the present invention provides a movable jig for welding stringers or reinforcing plates to a main plate. One example of a movable welding jig according to the invention is illustrated in FIGS. 1 and 2.

As may be seen from FIGS. 1 and 2, the movable welding jig of the invention includes a pair of wheel means 1 which are spaced from each other, in a direction extending transversely of the stringers 14 and 22 illustrated in FIG. 1. These wheel means 1 are movable longitudinally of the stringers. Thus, each wheel means 1 includes in the illustrated example a horizontally extending beam or bar 30 carrying at its ends brackets 32 which serve to support for free rotary movement wheels 5 of each wheel means 1. The set of wheels 5 of each wheel means 1 provides for movement of each wheel means 1 longitudinally of the stringers 14 and 22 which extend through a considerable distance through and beyond the movable jig of the invention.

Each of the wheel means 1 carries a plurality of posts 3 which are fixed to and extend upwardly from the wheel means 1. These posts 3 carry at their upper ends an upper support means 2 in the form of a suitable frame which extends over the space between the pair of wheel means 1 transversely across and over the several stringers 14, 22. This upper support means 2 of the movable jig of the invention carries a plurality of holding means 4 which extend downwardly from the upper support means 2 and serve to engage and hold the stringers 14 and 22 in an upright position resting with their lower edges on the main plate 23, while at the same time the several holding means 4 are movable longitudinally of the stringers 14 and 22.

In addition to the set of wheels 5 of the each wheel means 1 providing for longitudinal movement thereof with respect to the stringers, each wheel means includes a second set of wheels 6 (FIG. 2) providing for transverse movement of the movable jig, so that it can be properly situated on the main plate 23 whenever movement of the jig transversely of the stringers is required. The second set of wheels 6 of each wheel means 1 are supported on a suitable shaft 34 extending parallel to the bar or beam 30 and carried by a bracket structure 36 operatively connected with the piston of a fluid-pressure assembly 21 supplied with fluid under pressure from any suitable source, so that through this assembly 21, which is double-acting, the entire second set of wheels 6 of each wheel means 1 can be retracted upwardly to the inoperative position illustrated in FIG. 2 where the wheels 6 are out of engagement with the plate 23 or can be depressed downwardly against the plate 23, raising the wheels 5 and the remainder of the jig sufficiently so that the entire jig can then move transversely with respect to the directions in which the stringers are to extend.

The sets of wheels 5 and 6 of each wheel means 1 are respectively connected with a pair of drive means through which the sets of wheels are respectively driven. For this purpose a driving motor 7 is carried by the upper support means 2 and is operatively connected through a belt and pulley or sprocket and sprocket-chain transmission to a rotary shaft 12 supported for rotary movement in any suitable bearings carried by the upper support means 2. Through bevel gear transmissions 11 the shaft 12 transmits the drive to vertically extending shafts 9 which are supported for rotary movement also in suitable bearings carried, for example, on brackets fixed to the posts 3. These shafts 9 in turn drive lower bevel gear transmissions operatively connected with the wheels 5. Thus, the drive may be operatively connected with only one of the wheels 5 while the other may be freely rotatable. In the case of FIG. 2, the drive is connected to the left wheel 5.

The drive means which is operatively connected to the set of wheels 6 of each wheel means 1 includes a driving motor 8 which through a belt and pulley transmission or sprocket and sprocket-chain transmission drives a rotary shaft 13 from which bevel gear transmissions transmit the drive to shafts 10 which in turn are connected also through the bevel gear transmissions to at least one wheel 6 of each set of wheels 6 of each wheel means 1. This shaft 10 has a telescoped portion where the telescoped components are splined to each other, for example, so that the length of the shaft 10 can expand and contract sufficiently during retraction and lowering of the sets of wheels 6.

Each of the holding means 4 includes a pair of arms 4' which extend downwardly from and are carried by the upper support means 2. The right arms 4' of FIG. 1 carry through a suitable brackets fixed rollers 15, the term "fixed" being used in the sense that the axes of the rollers 15 have a predetermined position with respect to the jig. These fixed rollers 15 will engage the right side faces of the stringers 14, as viewed in FIG. 1. The left arms 4' of the pair of holding means shown in FIG. 1 carry movable rollers 16 which in turn are supported for rotary movement on any suitable brackets carried by fluid-pressure means 20 which are in turn carried by the lower ends of the left arms 4' of FIG. 1. These fluid-pressure means 20 can expand so as to press the movable roller 16 to the right, as viewed in FIG. 1, against the left faces of the stringers 14, and thus these stringers are reliably and precisely held in upright positions by the holding means 4 while at the same time the holding means can move longitudinally along the stringers.

The right holding means of FIG. 1 is of a construction which differs somewhat from the other two holding means illustrated in FIG. 1. This right holding means of FIG. 1 includes an arm 4' identical with the left arms 4' of the other two holding means and also carrying a fluid-pressure means 20 which through a suitable bracket supports a movable roller 16 for movement toward and away from the right stringer 22 shown in FIG. 1. However, in this case the holding means includes a bracket structure carried directly by the wheel means 1, at the upper bar 30 thereof, and/or by the posts 3 at lower portions thereof. This bracket structure serves to support for rotary movement a fixed roller 15' engaging the right side of the right stringer 22 of FIG. 1. As is shown schematically in FIG. 1 a gear transmission 38 is operatively connected on the one hand with the shaft 9 shown at the right in FIG. 1 and on the other hand with the fixed roller 15' of the right holding means so as to provide a direct drive for the roller 15'.

A plurality of pressing means 19 are provided for pressing the stringers 14 and 22 downwardly toward the main plate 23 so that the lower edges of the reinforcing plates or stringers are pressed forcefully against the main plate 23. Each pressing means 19 includes a fluid-pressure assembly in the form of a cylinder and piston structure where the cylinder may be fixed to the upper support means 2, extending downwardly therefrom, and the piston carries a bracket which supports for rotary movement a pressing roller 17 of each pressing means. The stringers are provided at their upper edges with transverse portions 14', 22' giving the stringers a substantially T-shaped configuration, and the pressing rollers 17 of the several pressing means press downwardly against these portions 14',22'. However, if the reinforcing plates do not have such portions then the pressing rollers will simply engage the upper edges of the reinforcing plates. It is also possible to support the several pressing means from the upper support means 2 by mounting the several pressing means on an arm of a holding means. Thus the intermediate and left pressing means 19 of FIG. 1 may be directly carried by the right arms 4' of the intermediate and left holding means 4, while the right pressing means 19 can be supported directly from the upper support means 2.

The several fluid-pressure units of the jig of the invention are connected through suitable flexible conduits to a source of fluid under pressure schematically represented as taking the form of an oil pump 18 (FIG. 2). Thus from this pump oil will be supplied under pressure for the several cylinders of the several pressing means 19, to the several cylinders 20 of the several holding means 4, and to the pair of cylinders 21 for the pair of wheel sets 6 to provide for transverse jig movement.

It is preferred to provide an arrangement where the several holding means 4 are adjustable. Thus the top ends of the arms 4' may have a dovetail type of connection with the upper support means 2, so that they terminate at their upper ends in guiding portions slidable along suitable ways which extend transversely with respect to the stringers 14. In this way the several arms 4' can be shifted to the right or left, as viewed in FIG. 1, until they are located at desired locations, and then any suitable set screws or the like may be used for fixing the arms 4' at their adjusted positions. The right arms 4' of the intermediate and left holding means of FIG. 1 will have their positions very precisely fixed since the fixed rollers 15 will determine the positions of the stringers 14, while the left arms 4' need not be precisely fixed since the fluid-pressure units 20 can expand to press the movable rollers 16 against the stringers.

In the same way, the top ends of the posts 3 may have identical adjustable connections with respect to the upper support means 2, so that in this way the posts 3 together with the wheel assemblies 1 can have the spacing therebetween adjusted. The bevel gears of the transmissions 11 which are on the shafts 12 and 13 may have a slidable, splined mounting on these shafts so that they will adapt themselves to the adjusted positions of the posts 3. Thus the entire jig is highly flexible so as to adapt itself to many different types of spacing of the stringers.

As is apparent from the above description, the movable jig of the invention may be used for tack-welding a selected number of stringers to a hull plate. In the illustrated example there are three stringers, namely the right stringer 22 of FIG. 1 and the pair of additional stringers 14. It is preferred to operate the jig of the invention according to a particular method of the present invention. According to this method the single right stringer 22 will first be tack-welded to the plate 23. Thus, this stringer 22 will initially be placed against the fixed rollers 15' and pressed thereagainst by the movable rollers 16 of the right arms 4' of the right holding means of FIG. 1. With this first stringer 22 very precisely positioned it is tack-welded to the main plate 23, and then the additional stringers 14 are positioned. These stringers 14 can initially be situated very roughly only approximately in their final positions, and for this purpose suitable cranes may be used. It will be noted that as a result of the initial joining of the stringer 22, this stringer 22 will act as a guide stringer for determining the position of the entire jig. The right arms 4' of the intermediate and left holding means 4 of FIG. 1 will be very precisely positioned, as pointed out above, so as to determine the locations of the stringers 14, and then with the left arms 4' only roughly positioned it is possible to expand the pair of left fluid-pressure units 20 so as to press the left movable roller 16 against the stringers 14. The fluid under pressure is delivered to the several pressing means 19 so that all of the pressing rollers 17 are urged downwardly, and this will result in a force tending to lift the entire jig upwardly away from the plate 23, so that the weight of the entire jig is used for pressing the several stringers downwardly against the main plate 23. This will also result in reducing the engagement between the wheels 5 and the plate 23, so that the driving of the jig 22 longitudinally of the stringers will take place primarily by way of the driving rollers 15', so that the stringer 22 acts as a guide for the jig achieving an extremely precise positioning of the additional stringer 14 with respect to each other as well as with respect to the stringer 22.

The tack-welding operations can be effected manually at any time while the stringers are held properly positioned by the jig of the invention and the jig can be moved along the several stringers as required. If desired the tack-welding operations can be carried out manually or an automatic tack-welding structure may be operatively connected with the jig to move therewith for achieving an automatic tack-welding. Moreover, it is possible to arrange a series of jigs in end to end relation so that, referring to FIG. 1, additional movable jigs will be located to the right and left of the jig illustrated in FIG. 1 abutting thereagainst in end to end relation. With such an arrangement all of the jigs arranged in a row extending transversely of the stringers can be simultaneously moved longitudinally therealong, so that it becomes possible to carry out the above operations in connection with any desired number of stringers. Moreover, because of the presence of motors 7,8, and a motor-driven pump 18, virtually all of the operations can be carried out by push-button types of operations. Thus manual operations are reduced to a minimum. Before and after the tack-welding operations are carried out the entire jig can be moved transversely by way of the sets of wheels 6 of the pair of wheel means 1, and of course for this purpose the fluid-pressure units 21 are brought into operation with the drive taking place through the telescoped drive shafts 10 and the shaft 13 driven from the motor 8 in the manner described above.

Thus, with the present invention it becomes possible to completely eliminate jigs such as the jig 54 of FIG. 3, directly welded to the main plate. Thus the quality of the latter will not unavoidably deteriorate due to the welding of jigs thereto. Undesirable annealing will not take place in the high quality steel of these plates. Moreover, the desired spacing between the stringers can be very precisely achieved with the latter extending perpendicularly with respect to the main plate, so that the accuracy with which the several components are joined to each is very greatly increased as compared to conventional expedients. Moreover, the entire operations can be carried out simply by operating push-buttons, so that the time required for carrying out the operations is greatly reduced, the number of operators can be reduced, and therefore a considerable advantage is achieved both with respect to time as well as with respect to cost.

What is claimed is:

1. A movable welding jig for holding a plurality of upright reinforcing plates on a main plate so that the reinforcing plates can be welded to the main plate, comprising a pair of wheel means situated on the main plate for movement therealong longitudinally of the reinforcing plates, a plurality of posts carried by and extending upwardly from said pair of wheel means, upper support means carried by said posts at an elevation higher than said wheel means and extending across a space between said wheel means for extending over and transversely across reinforcing plates on said main plate, a plurality of holding means carried by said upper support means and extending downwardly therefrom for engaging and holding reinforcing plates in upright positions on said main plate while being movable longitudinally of the reinforcing plates together with the pair of wheel means, said posts, and said upper support means, and a plurality of pressing means carried by said upper support means and extending downwardly therefrom for pressing the reinforcing plates held in the upright positions by said plurality of holding means toward the main plate while also being movable longitudinally along the reinforcing plates, so that while the reinforcing plates have lower edges pressed against the main plate and are maintained at predetermined positions with respect thereto the entire assembly of wheel means, posts, upper support means, holding means, and pressing means can move longitudinally of the reinforcing plates.

2. The combination of claim 1 and wherein said pair of wheel means are each provided with one set of wheels for movement longitudinally of the reinforcing plates and a second set of wheels for movement transversely of the reinforcing plates, and means carried by each wheel means and coacting with the second set of wheels for retracting the latter to an inoperative position and for advancing the second set of wheels of each wheel means downwardly to an operative position engaging the main plate when the pair of wheel means with all of the structure carried thereby are to be moved transversely of the direction in which the reinforcing plates extend.

3. The combination of claim 1 and wherein said plurality of holding means are connected with said upper support means for adjustable movement with respect thereto transversely of the reinforcing plates, to adjust the space therebetween.

4. The combination of claim 1 and wherein a drive means is carried by said upper support means and extends therefrom into operative relation with respect to said wheel means for driving the latter longitudinally of the reinforcing plates.

5. The combination of claim 1 and wherein each holding means includes a fixed roller for engaging one side of a reinforcing plate while having rolling contact therewith and a movable roller for engaging the other side of the reinforcing plate while having rolling contact therewith, and means forming part of each holding means for pressing the movable roller thereof toward the reinforcing plate held between the latter rollers so that each reinforcing plate will be pressed against the fixed roller of each holding means.

6. The combination of claim 5 and wherein a drive means is operatively connected with at least one fixed roller of one of said holding means for driving said one fixed roller so as to advance the entire jig along a reinforcing plate engaged by said one fixed roller, whereby once the position of the latter reinforcing plate which is engaged by said one roller is determined, the positions of the remaining reinforcing plates can be determined with respect to the reinforcing plate along which said one roller is driven, whereby the latter reinforcing plate will act as a guide for the entire jig.

7. The combination of claim 1 and wherein each pressing means includes a lower pressing roller and a fluid-pressure means carried by said upper support means and operatively connected with said lower pressing roller for urging the latter downwardly toward a reinforcing plate at the region of an upper edge thereof, whereby the plurality of pressing means act to apply the weight of the entire jig to the reinforcing plates for pressing the latter toward the main plate.

8. The combination of claim 2 and wherein a pair of drive means are carried by said upper support means and extend therefrom into operative relation with respect to the sets of wheels for driving the latter.

9. The combination of claim 1 and wherein said plurality of posts are adjustably connected to said upper support means for adjustable movement therealong transversely with respect to reinforcing plates so as to adjust the spacing of the pair of wheel means.

10. The combination of claim 1 and wherein the plurality of pressing means respectively include a plurality of fluid-pressure units for achieving a pressing force, and means carried by the upper support means and operatively connected with the latter units for supplying fluid under pressure thereto.

* * * * *